July 13, 1965 R. A. COCHRANE 3,194,585
ROCK LOCK TYPE FIFTH WHEEL LOCKING MECHANISM
Filed April 19, 1963 2 Sheets-Sheet 1

Reuel A. Cochrane
INVENTOR.

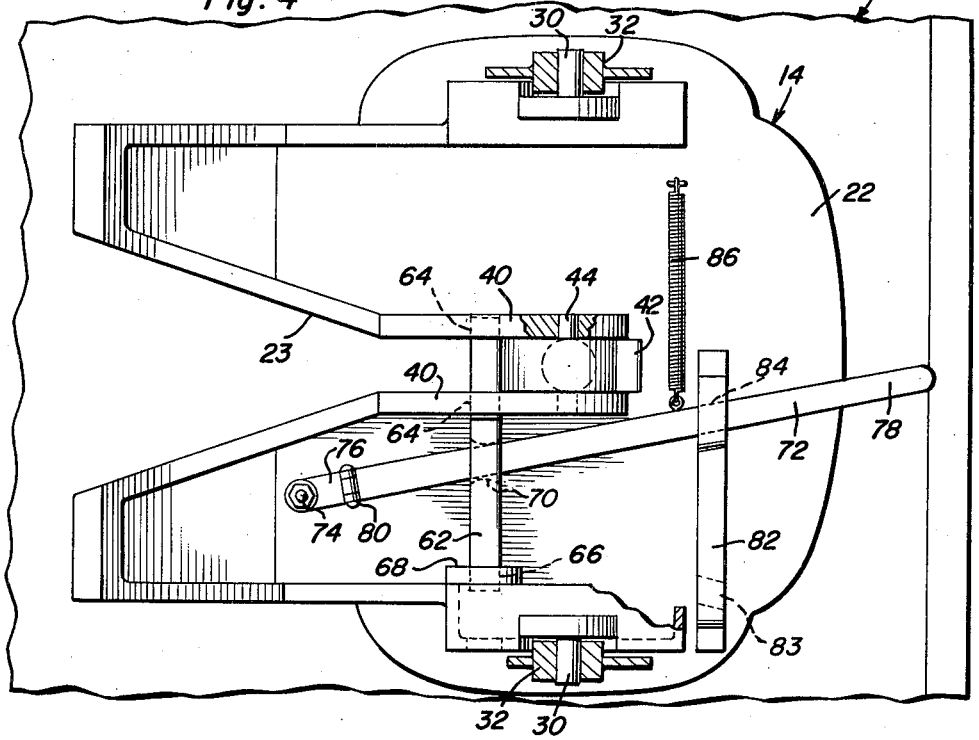
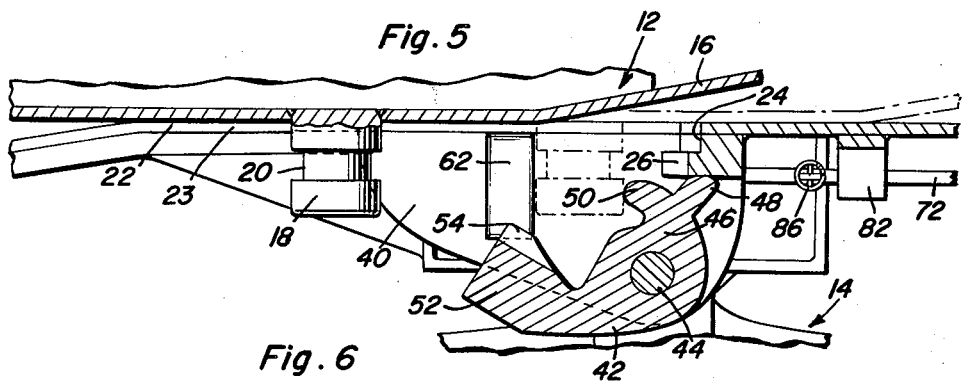
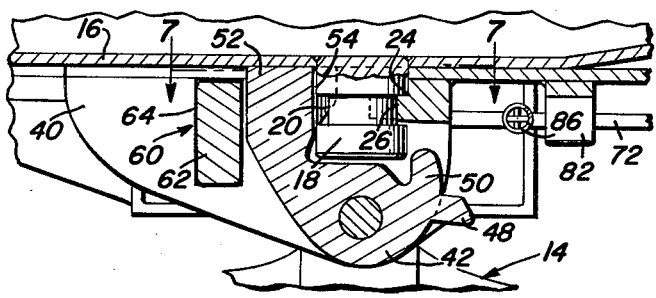
Reuel A. Cochrane
INVENTOR.

3,194,585
ROCK LOCK TYPE FIFTH WHEEL LOCKING MECHANISM
Reuel A. Cochrane, Chilesburg, Va.
(P.O. Box 281, Benghazi, Libya)
Filed Apr. 19, 1963, Ser. No. 274,132
1 Claim. (Cl. 280—437)

This invention relates to a novel and useful fifth wheel pin locking mechanism constructed in a manner whereby it may be readily incorporated in the manufacture of conventional types of fifth wheel bearing plates and constitutes an improvement over the locking mechanism disclosed in U.S. Patent No. 2,833,560.

The main object of this invention is to provide a fifth wheel pin locking assembly of the type which will afford a means whereby the fifth wheel pin of a semi-trailer may be encircled a full 360° by means of the fifth wheel bearing plate and locking mechanism of the instant invention. In this manner, fifth wheel pin may be placed in shear at its largest diameter at the point where it emerges from the bearing plate.

Still another object of this invention is to provide a fifth wheel locking mechanism designed in a manner to be capable of absorbing forces greater than that required to shear the fifth wheel pin at its largest diameter.

A further object of this invention is to provide an improved fifth wheel locking mechanism requiring only two moving parts.

Yet another object of this invention is to provide a locking mechanism in accordance with the preceding objects designed in a manner whereby the moving parts thereof may be readily cast and assembled with a minimum of machine work required.

Another object of this invention is to provide a fifth locking mechanism which will be semi-automatically actuated upon forward movement of a trailer fifth wheel pin forwardly through the slot formed in the bearing plate and into seated engagement with the forward end of the slot.

A final object to be specifically enumerated herein is to provide a fifth wheel locking mechanism in accordance with the preceding objects which will conform to conventional forms of manufacture, be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 4 is a fragmentary bottom plan view of the assembly illustrated in FIGURES 1-3 with parts thereof being broken away and shown in section;

FIGURE 5 is a fragmentary longitudinal vertical sectional view of the fifth wheel assembly taken substantially upon a plane passing through the longitudinal centerline thereof;

FIGURE 6 is a fragmentary longitudinal vertical sectional view similar to that of FIGURE 5 but showing the locking mechanism in the locked position.

Figure 1:
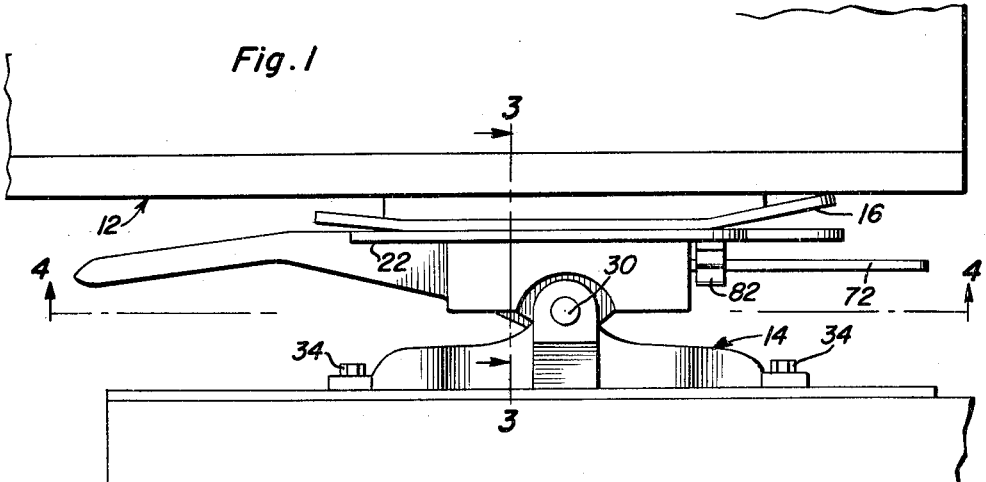
FIGURE 1 is a fragmentary side elevational view of a fifth wheel assembly constructed in accordance with the present invention.

Referring now more specifically to the drawings, the numeral 10 generally designates a portion of the frame of a conventional type of tractor vehicle to which there is secured the forward end of a semi-trailer vehicle generally referred to by the reference numeral 12 by means of a fifth wheel assembly generally referred to by the reference numeral 14. The fifth wheel assembly 14 includes a bearing plate 16 which is supported from the underside of the semi-trailer 12 and includes a depending fifth wheel pin 18 provided with a circumferential groove 20. The fifth wheel assembly 14 also includes a more or less conventional fifth wheel plate 22 having a rearwardly opening slot 23 formed therein and which terminates at its forward end in a rearwardly facing and upstanding generally semi-cylindrical seat 24. The seat 24 is stepped and includes a smaller radius portion 26 which is receivable in the circumferential groove 20 as shown in FIGURE 6 of the drawings.

The fifth wheel plate 22 includes a pair of depending journals 28 which rotatably receive a pair of pivot pins 30 that are also rotatably journaled in upstanding journals 32 secured to the frame 12 in any suitable manner such as by fasteners 34. In this manner, the fifth wheel plate 22 is mounted for oscillation about a generally horizontally disposed axis extending transversely of the frame 10 and of the slot 23.

Instead of the conventional locking mechanism the fifth wheel plate 22 is provided with the locking mechanism generally referred to by the reference numeral 38 and it will be noted that this mechanism includes a pair of depending journal plates 40 which are supported from the fifth wheel plate 22 and pivotally support therebetween a cam and seat member generally referred to by the reference numeral 42 by means of a pivot pin 44 which is rotatably supported between the journal plates 40.

The cam and seat member 42 includes an abutment portion or cam portion 46 including first and second abutment elements 48 and 50. The cam and seat member 42 also includes a seat portion 52 defining a generally semi-cylindrical seat 54. The abutment element 48 is engageable with the undersurface of the block defining the seat 24 at the forward end of the slot 23 and the abutment element 50 is engageable by the lower terminal end portion of the fifth wheel pin 18 as the fifth wheel pin 18 is moved rearwardly through the slot and into engagement with the seat 24. From a comparison of FIGURES 5 and 6 of the drawings, it may be seen that as the fifth wheel pin 18 moves into final seated engagement with the seat 24 the cam and seat member 42 is pivoted in a clockwise direction as viewed in FIGURE 5 of the drawings to the position illustrated in FIGURE 6 of the drawings whereupon the seat portion 52 thereof has been swung forwardly and upwardly into registry with the slot 23 and into a position opposing the seat 24 while the abutment element 50 has been swung rearwardly and downwardly out of registry with the slot 23.

The fifth wheel plate 22 is provided with a latching mechanism generally referred to by the reference numeral 60 including an abutment and locking bar 62. The locking bar 62 is substantially rectangular in cross section and is slidingly received through aligned openings 64 formed in the depending journals 40 and the opening 66 formed in a depending mounting lug 68 which is also supported from the fifth wheel plate 22.

Figure 2:
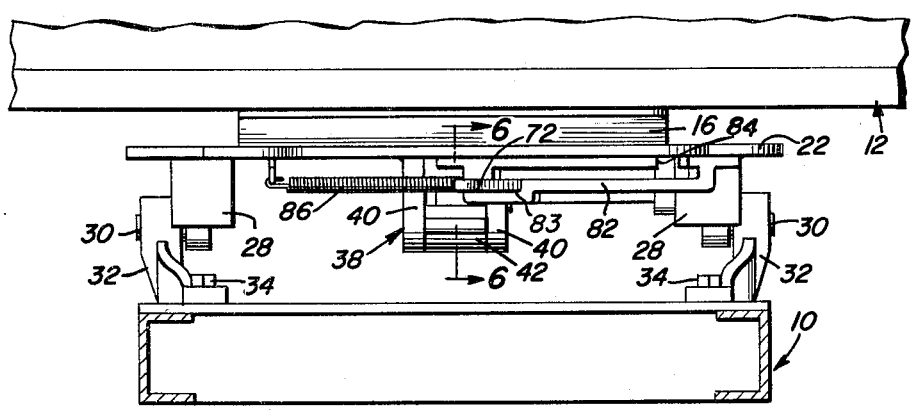
FIGURE 2 is a fragmentary end elevational view of the assembly illustrated in FIGURE 1 and as seen from the right side thereof.
Figure 3:
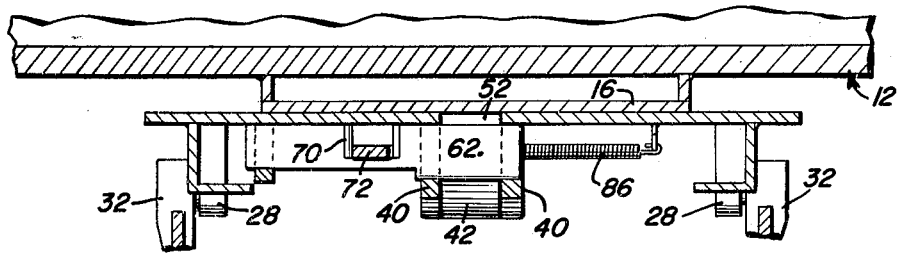
FIGURE 3 is a fragmentary vertical transverse sectional view taken substantially upon the plane indicated by the section line 3—3 of FIGURE 1.
Figure 7:
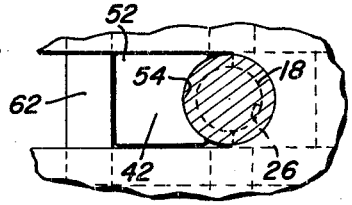
FIGURE 7 is a fragmentary horizontal sectional view taken substantially upon the plane indicated by the section line 7—7 of FIGURE 6.

The locking bar 62 is notched as at 70, see FIGURE 3, and loosely receives therethrough an actuator lever 72 which is pivoted to the fifth wheel plate 22 as at 74, see FIGURE 4. The actuating lever 72 includes a first section 76 and a second section 78. The two sections 76 and 78 are interconnected by means of a hinge 80 and a depending guide 82 is supported from the fifth wheel plate 22 and includes notches 83 and 84, see FIGURES 2 and 4, for retaining the actuating lever 72 in its two limit positions of its movement. An expansion spring 86 is provided and is connected between the fifth wheel plate 22 and the actuating lever 72 and yieldingly urges the actuating lever 72 toward its other limit position of movement with the locking bar 62 extending across the forward end of the slot 23 immediately behind the cam and seat member 42 when the latter is in its locked position as illustrated in FIGURE 6 of the drawings. Upon oscillation of the actuating lever 72 against the tension of the spring 86 the locking bar 62 will be withdrawn from its latched position in alignment with the slot 23 and the seating engagement of the actuating lever 72 with the notch 83 will retain the actuating lever 72 in a position with the locking bar 62 in its retracted position. From FIGURE 5 of the drawings it may be seen that when the cam and seat member 42 is in its released or operative position a portion thereof is in registry with the openings 64 and thereby prevents movement of the locking bar 62 to the latched position. From a comparison of FIGURES 5 and 6 of the drawings it may be seen that the locking bar 62 may not be moved to the latched position until such time as the cam and seat member has been pivoted to its operative position illustrated in FIGURE 6 of the drawings. Accordingly, it is impossible for the locking bar 62 to be moved to the locked or latched position without the fifth wheel pin 18 being seated in the seat 24.

It will of course be noted that the small radius portion 26 of the seat 24 interlockingly engages with the grooved pin 18 to prevent vertical withdrawal of the pin 18 from the generally cylindrical pocket defined by the seat 24 and the seat 54. From FIGURE 6 of the drawings it may further be noted that when the cam and seat member 42 is in the locked position the fifth wheel pin 18 is disposed in shear at its point of largest diameter where it protrudes upwardly from the slot 23 and at a point immediately adjacent the bearing plate 16 to which it is secured.

It may further be seen that the locking mechanism 38 includes only two moving parts other than the actuating lever 72 and that its components may be readily fabricated and produced at a low cost. Further, in view of the relative simplicity of the locking mechanism 38, it has an extremely long life expectancy and may be readily serviced if servicing is required.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, a fifth wheel bearing plate adapted to be pivotally secured to a tractor vehicle for rotation about a generally horizontally disposed axis extending transversely of said tractor vehicle and having a rearwardly opening vertically extending slot formed therein whose forward end defines an upstanding and rearwardly opening generally semi-cylindrical seat adapted to snugly and seatingly receive the depending fifth wheel pin of an associated trailer vehicle, a pair of depending journal plates supported from said plate and generally paralleling and disposed on opposite sides of said slot, a cam and seat member including a forward cam portion and a rear generally semi-cylindrical seat portion, means supporting said cam and seat portions between said journal plates for movement about a horizontal transverse axis between a first open position with said seat portion swung rearwardly and downwardly in an out-of-the-way position and said cam portion swung rearwardly and upwardly and aligned with said slot and disposed rearwardly of said seat and a second closed position with said cam portion swung forwardly and downwardly and shifted out of registry with said slot and said seat portion swung forwardly and upwardly and disposed in said slot rearwardly of and opposing said seat and forming, together with the latter, cylindrical bearing means for rotatably receiving said kingpin and adapted to be moved from said first position to said second position upon engagement of said kingpin with said cam portion as said kingpin is moved forwardly through said slot and into seated engagement with said seat, said journal plates having a pair of aligned transverse openings formed therethrough disposed immediately rearwardly of said cam and seat member when the latter is in said second position, an elongated generally horizontal locking bar, means independent of said journal plates guidingly supporting said bar at points spaced longitudinally therealong for straight line longitudinal reciprocation between a first limit position extending through said openings and a second limit position retracted to one side of said slot and with the end of said locking bar adjacent said slot disposed in the adjacent opening, said cam and seat member, when disposed out of said second position, defining abutment means disposed in registry with said openings and engageable by said end of said bar to prevent movement of said bar toward its first position, said bar, when the latter is disposed in its second position comprising a backing member for said cam and seat member preventing its movement toward its first position at the rear end of said slot, said cam and seat member including an abutment element projecting generally radially outwardly therefrom and disposed forwardly of said cam portion in the direction of rotation of said cam and seat member when moving from said first postion to said second position and engageable with abutment means supported from said bearing plate upon movement of said cam and seat member from said second position toward said first postion and defining means limiting movement of said cam and seat member toward said first position.

References Cited by the Examiner

UNITED STATES PATENTS 2,833,560 5/58 Cochrane _____ 280—437
2,838,326 6/58 Georgi _____ 280—434
3,056,612 10/62 Slaven _____ 280—434

A. HARRY LEVY, *Primary Examiner.*
LEO FRIAGLIA, *Examiner.*